(12) United States Patent
Kuparinen et al.

(10) Patent No.: US 8,189,607 B2
(45) Date of Patent: May 29, 2012

(54) INTERFACE SELECTION IN A MOVING NETWORK

(75) Inventors: Martti Kuparinen, Masala (FI); Heikki Mahkonen, Helsinki (FI); Tero Kauppinen, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 144 days.

(21) Appl. No.: 12/531,651

(22) PCT Filed: Mar. 16, 2007

(86) PCT No.: PCT/EP2007/052547
§ 371 (c)(1),
(2), (4) Date: Mar. 8, 2010

(87) PCT Pub. No.: WO2008/113406
PCT Pub. Date: Sep. 25, 2008

(65) Prior Publication Data
US 2010/0226310 A1 Sep. 9, 2010

(51) Int. Cl.
*H04L 12/28* (2006.01)

(52) U.S. Cl. ......... 370/401; 370/332; 370/466; 370/392

(58) Field of Classification Search .................. None
See application file for complete search history.

(56) References Cited

U.S. PATENT DOCUMENTS

| | | | | |
|---|---|---|---|---|
| 6,845,091 B2 * | 1/2005 | Ogier et al. | | 370/338 |
| 7,006,472 B1 * | 2/2006 | Immonen et al. | | 370/332 |
| 7,286,520 B2 * | 10/2007 | Takeda et al. | | 370/349 |
| 7,725,600 B2 * | 5/2010 | Zheng et al. | | 709/245 |
| 2002/0183346 A1 * | 12/2002 | Zhi et al. | | 514/291 |
| 2007/0053334 A1 * | 3/2007 | Sueyoshi et al. | | 370/338 |
| 2008/0205313 A1 * | 8/2008 | Thubert | | 370/310 |
| 2009/0147789 A1 * | 6/2009 | Ng et al. | | 370/392 |

* cited by examiner

*Primary Examiner* — Duc C Ho

(57) ABSTRACT

Method for establishing a traffic route for a mobile network node attached to a mobile router, wherein the mobile router has a plurality of upstream interfaces, by sending, from the mobile router to the mobile network node, identifiers of the interfaces and their properties; the identifiers are mapped to IPv6 traffic classes or IPv4 type of service. At the mobile network node, an interface is chosen based upon the identified interface properties. The traffic class or type of service field of at least certain outgoing packets includes the identifier of the chosen interface. At the mobile router, packets are routed across the interface corresponding to the identifier contained in the traffic class or type of service fields.

18 Claims, 2 Drawing Sheets

| Type | Length | ID |
|------|--------|-----|
| Access Network Characteristics |||

INTERFACE SELECTION IN A MOVING NETWORK

TECHNICAL FIELD

The present invention relates to interface selection in a moving network and in particular to the selection of an interface upstream of a mobile router by a mobile network node located downstream of that mobile router.

BACKGROUND

Trains, busses, airplanes and Personal Area Networks (PANs) are examples of use cases where moving network technologies can be applied. A moving wireless network is a cluster consisting of Mobile Network Nodes (MNNs) and Mobile Routers (MRs). A Mobile Router routes IP traffic between a MNN and the Internet (or other IP network). The Mobile Router acts as an access point for the MNN. A Mobile Router may be connected to another moving network or directly to the Internet via an access point (AP). In the former case, a set of nested mobile networks results. The IETF RFC 3963 proposes a Network Mobility (NEMO) protocol according to this architecture.

According to IETF RFC 2461, a Mobile Router broadcasts Routing Advertisement (RA) messages to advertise its existence and to inform MNNs that it provides a mobile routing service. The RAs may contain an operator identifier, for example, to aid selection of an appropriate network by a user. When a MNN finds a suitable Mobile Router, the MNN triggers an attachment exchange with the Mobile Router.

It will be appreciated that when a Mobile Router changes its point of attachment to the Internet, or is handed-off to another Mobile Router, the locations (i.e. IP addresses) of all of the downstream MNNs will change. In order to maintain service continuity during and after hand-off of a Mobile Router, some mechanism is required in order to ensure that data sent from peer (or correspondent) nodes involved in a communication session with the MNN is sent to the MNN at the node's new location. The approach adopted by NEMO involves the creation of a tunnel between the Mobile Router and some home router (or "home agent") within the fixed network. All traffic sent from a Peer Node to a MNN (and possibly traffic sent in the reverse direction) is routed through the tunnel. When the Mobile Router changes its location, it sends an update to the home router. It may be possible for the MNN to delegate responsibility for location update signalling to an upstream Mobile Router. The key point however is that the network prefix used by the MNN remains unchanged as the Mobile Router moves.

A Mobile Router performs home registration of its upstream or "egress" interface as described in the MIPv6 specification to allow for changes in the point of attachment of the interface to the Internet. When the Mobile Router uses multiple egress interfaces it can have more than one home registration at the same time. This is described in the IETF monami6 working group specification related to multiple care-of-addresses (MCoA).

As well as having multiple egress interfaces, a MR may provide multiple downstream or ingress interfaces. The MR must allocate a different network prefix to each of the various ingress interfaces. These multiple network prefixes must be registered with the HA in addition to the normal MIPv6 home registration. MNNs or "hosts" attached to the ingress interface of the Mobile Router configure IPv6 addresses using the prefix appropriate for the chosen interface, and the Mobile Router tunnels all traffic from the MNNs attached to the ingress interface to the Home Agent (HA) of the Mobile Router. The HA then sends this traffic to the Internet. All traffic which is addressed to a network prefix delegated to an ingress interface of the Mobile Router arrives at the HA, which intercepts the traffic and forwards it to the Mobile Router which in turn routes it to the correct ingress interface.

When a Mobile Router has more than one home registration (i.e. it has multiple egress interfaces) it also has more than one route between the HA and itself. The traffic characteristics of these different paths between the HA and Mobile Router can be quite different. However, MNNs attached to the ingress interface(s) of the Mobile Router do not know anything about the egress interfaces of the Mobile Router and what kind of services the Mobile Router can offer through these. In addition, even if a MNN attached to an ingress interface of the Mobile Router could influence the choice of egress interface through which outgoing packets are routed, it is not easy to see how the MNN could influence the downlink path that packets take from the HA to the Mobile Router.

SUMMARY

The present invention provides a method for a Mobile Router with multiple egress interfaces to inform downstream Mobile Network Nodes of the Mobile Router's upstream interfaces and their characteristics. In the case of IPv6, notification may be achieved using a new Router Advertisement (RA) option which includes an identifier and a characteristics descriptor. When a Mobile Network Node receives such an RA option, it learns the capabilities of its next-hop router, that is the Mobile Router, and may set the Traffic Class field in the IPv6 header accordingly. The identifier may have the format of an 8-bit integer which can be directly mapped to the Traffic Class (TC) field found in the IPv6 header. This allows the Mobile Router to route outgoing packets using the desired interface. In the case of IPv4, the type of service (ToS) field may be employed instead of the Traffic Class field.

The terms Traffic Class and Type of Service have specific meanings in terms of the existing IPv4 and IPv6 standards. However, it will be appreciated that in future standards, different terms may be employed, and it is intended that these also will fall within the scope of this invention. In particular, it is intended that the invention applies to all cases where the interface identifiers are mapped to fields the intended purpose of which is to identify and distinguish between different classes or priorities of packets.

According to a first aspect of the present invention there is provided a method of establishing a traffic route for a mobile network node attached to a mobile router, where the mobile router has a plurality of upstream interfaces available to it. The method comprises sending from the mobile router to the mobile node, identifiers of the interfaces and of their properties, the identifiers mapping to IPv6 traffic classes or IPv4 type of service. In the case of IPv6, the identifiers may be contained within router advertisement messages broadcast by the mobile router. At the mobile network node, an interface is chosen based upon the identified interface properties. The traffic class or type of service field of at least certain outgoing packets includes the identifier of the chosen interface. At the mobile router, packets are routed across the interface corresponding to the identifier contained in the traffic class or type of service fields, typically using rules created upon detection of a traffic class value in a packet header.

The invention makes it possible for a Mobile Network Node to select which outgoing interface should be used on the Mobile Router. Without this kind of mechanism the data might be sent out on an interface which is not preferred (in terms of bit-rate, cost, etc) for this traffic.

According to a second aspect of the present invention there is provided a mobile router comprising means for providing a plurality of upstream interfaces. These could, for example, be a WLAN interface and a 3G interface. A first transmitter is provided for sending to a mobile network node identifiers of the interfaces and of their properties, the identifiers mapping to IPv6 traffic classes or IPv4 type of service. A receiver receives packets from downstream mobile network nodes. The router comprises means for mapping traffic class or type of service fields within at least certain received packets to upstream interfaces, and a second transmitter for causing packets to be routed across the interfaces corresponding to the identifiers contained in traffic class or type of service fields.

According to a third aspect of the present invention there is provided a mobile network node comprising a receiver for receiving from a mobile router identifiers of the upstream interfaces available to the mobile router and of their properties, the identifiers mapping to IPv6 traffic classes or IPv4 type of service, means for choosing an interface based upon the identified interface properties, and means for including in the traffic class or type of service field of at least certain outgoing packets, the identifier of the chosen interface.

DETAILED DESCRIPTION

Figures 1, 2:
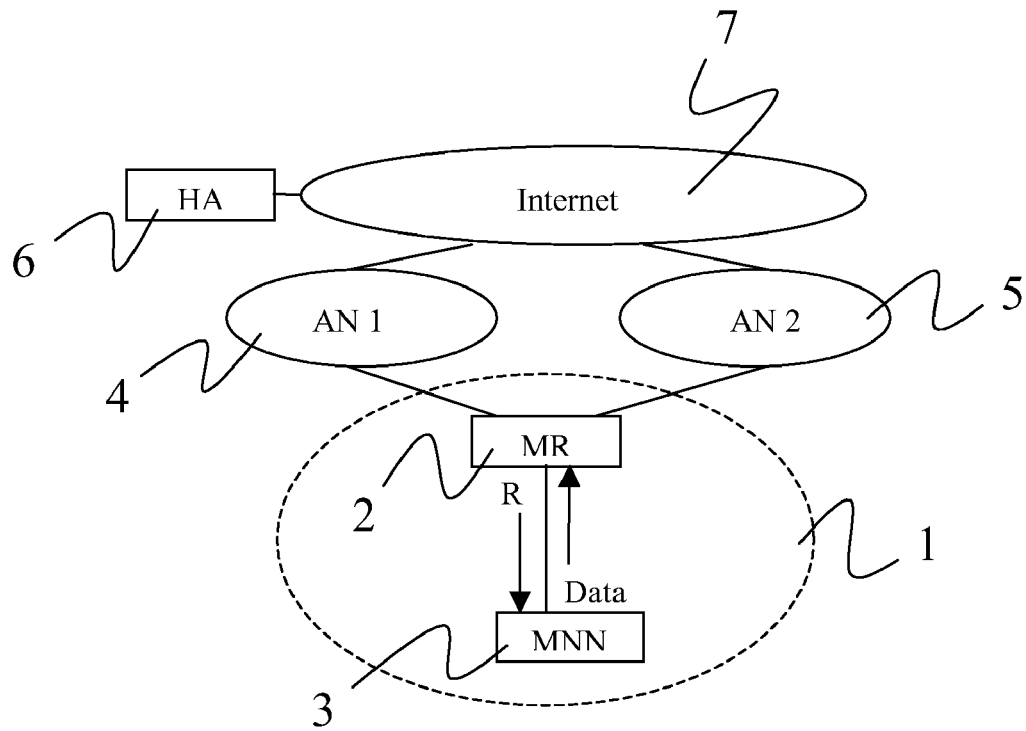
FIG. 1 illustrates schematically a moving wireless network comprising a Mobile Network Node attached to a Mobile Router.
FIG. 2 illustrates schematically the structure of a new options field of a Router Advertisement message for accommodating an interface identifier and associated properties.

FIG. 1 illustrates a moving network 1 which comprises a Mobile Router (MR) 2 and one or more Moving Network Nodes (MNNs) which are attached to the MR. The Figure illustrates only a single MNN 3. The MR 2 is assumed to have available to it two upstream or egress interfaces associated respectively with wireless access networks AN1 and AN2 (identified respectively by reference numerals 4 and 5). AN1 and AN2 allow the MR to connect to the Internet 7 (or other IP network). In a typical scenario, AN1 and AN2 could be respective WiFi networks, or could be Wi-Max, cellular telephone networks, etc. In some cases, the access networks may correspond to different access technologies within the same access network, or indeed may use the same access technology within the same access network but correspond to different link qualities.

The MR 2 is required to register a care-of-address (CoA) for each of its egress interfaces with a Home Agent (HA) 6 using the MCoA extension to MIPv6. The HA is located within a home network of the MR, typically within a cell phone network operator's core network and to which the operator of the MR is a subscriber. As is well known, the HA acts as an anchor point for data flowing between the MR and correspondent nodes. As well as registering a CoA for each egress interface, the MR learns the capabilities of its access networks and adds this information to the Routing Advertisement (RA) messages that it broadcasts periodically. A MNN receiving a RA message can then use this information to let the MR know which egress interface is preferred for the outgoing traffic. The MR can set or change rules within the HA associated with the interfaces. The use of rules within the HA is described further below. [This architecture does not preclude the MNN itself employing a mobility protocol, adding a further HA to the traffic path.]

IPv6 specifies (RFC 2461 chapter 4.2) that RA messages may contain "options" fields. In this case, the MR adds one RA option for each egress interface containing an identifier for the interface and describing the characteristics of that interface. The structure of the new RA option is illustrated in FIG. 2. The Type and Length fields are as described in the relevant RFC. The ID field defines the identifier which the MNN must use when it wants to use the access network which has the characteristics defined in the Access Network Characteristics field. The length of the Access Network Characteristics field can be determined from the Length field. The Access Network Characteristics field carries information which the MNN uses to determine which egress interface to use for outgoing traffic. The format of this field can be set as required.

When applied to IPv6, the ID field is directly mapped to the IPv6 header's Traffic Class field as defined in IETF RFC 2460. This allows the MNN to tag outgoing packets which should be routed using a specific egress interface on the MR by modifying only the IPv6 header. The result is that no other signalling is required between the MNN and MR. If the Traffic Class field is already used by some upper-layer protocol, the MNN tunnels the packet to the MR, e.g. using link-local addresses. In this case the ID field is included in the Traffic Class field of the outer IPv6 header.

The MR examines incoming packets to determine if a rule has been established mapping the source and destination addresses to an upstream interface. If no rule has been established, and if a packet contains a value in the Traffic Class field, the MR creates a new rule mapping the source and destination addresses to the interface corresponding to the Traffic Class value. For subsequent outgoing packets belonging to the same stream, the MR does not have to look at the Traffic Class field: it merely has to match the source and destination IP addresses to the pre-established rule and select the interface accordingly.

It is possible that the rule established at the MR is maintained according to a fixed length timer. The timer is reset each time a packet is received for a given stream. If the timer expires, the associated rule is deleted. If the MNN subsequently sends a further packet for the same stream, the MR must recreate a rule based upon the Traffic Class value. By including the Traffic Class value in all packets, the MR can also detect when a MNN wishes to change the upstream interface for a given stream. This also facilitates mobility, allowing the MNN to move to a new MR whilst allowing the new MR to establish an appropriate rule.

Incoming traffic for a MNN attached to the ingress interface of the MR will arrive at the home link of the MR (identified by the network prefix used by the MNN) and is intercepted by the HA of the MR. If the MR has registered more than one CoA, the HA has more than one possible route to choose from when forwarding this traffic to the MR. However, it will generally be preferable to forward this traffic via the same route as was taken by the outgoing traffic so that the "service" seen by the MNN is the same in both directions. To determine which route to use, the HA consults its rules (routing table entry, rules, flow binding etc.) which define the traffic path from the HA to the MR for specific traffic flows.

One of the paths between the HA and the MR is specified as a default path. If outgoing traffic from the MNN is using the default path, the MR does not have to add a specific rule at the HA for this traffic and rather a default rule is applied. [In this case, a "rule" defines how packets meeting certain criteria or none should be routed.] However, if the MNN has requested that a path other than the default path should be used for its traffic, the MR must add a new rule to the HA to route incoming traffic (destined for the MNN) via this path. Thus, at the same time as the MR creates a rule for outgoing packets, it installs a corresponding rule into the HA for routing incoming packets.

The new rule must be negotiated between the HA and the MR. The MR sends the new rule to the HA and the HA adds this rule to its rule database. The HA acknowledges receipt of the rule and indicates its acceptance or refusal. Before a new rule is added the HA will have maintained a routing entry which dictates that all traffic arriving to the delegated prefix should be sent to the MR via the default path. When the MR injects a new rule for the MNN, the MR router specifies a collection of information combined both from the IP header (source and destination addresses, etc.) and upper layer headers (TCP/UDP ports etc.) to uniquely identify the flow to the HA. When the information in an incoming packet matches this information, the HA must forward this traffic to the MR via the specified route. It is noted that the identifier which defines the chosen interface need not be communicated by the MR to the HA. This identifier is merely used between the MNN and the MR.

Figure 3:
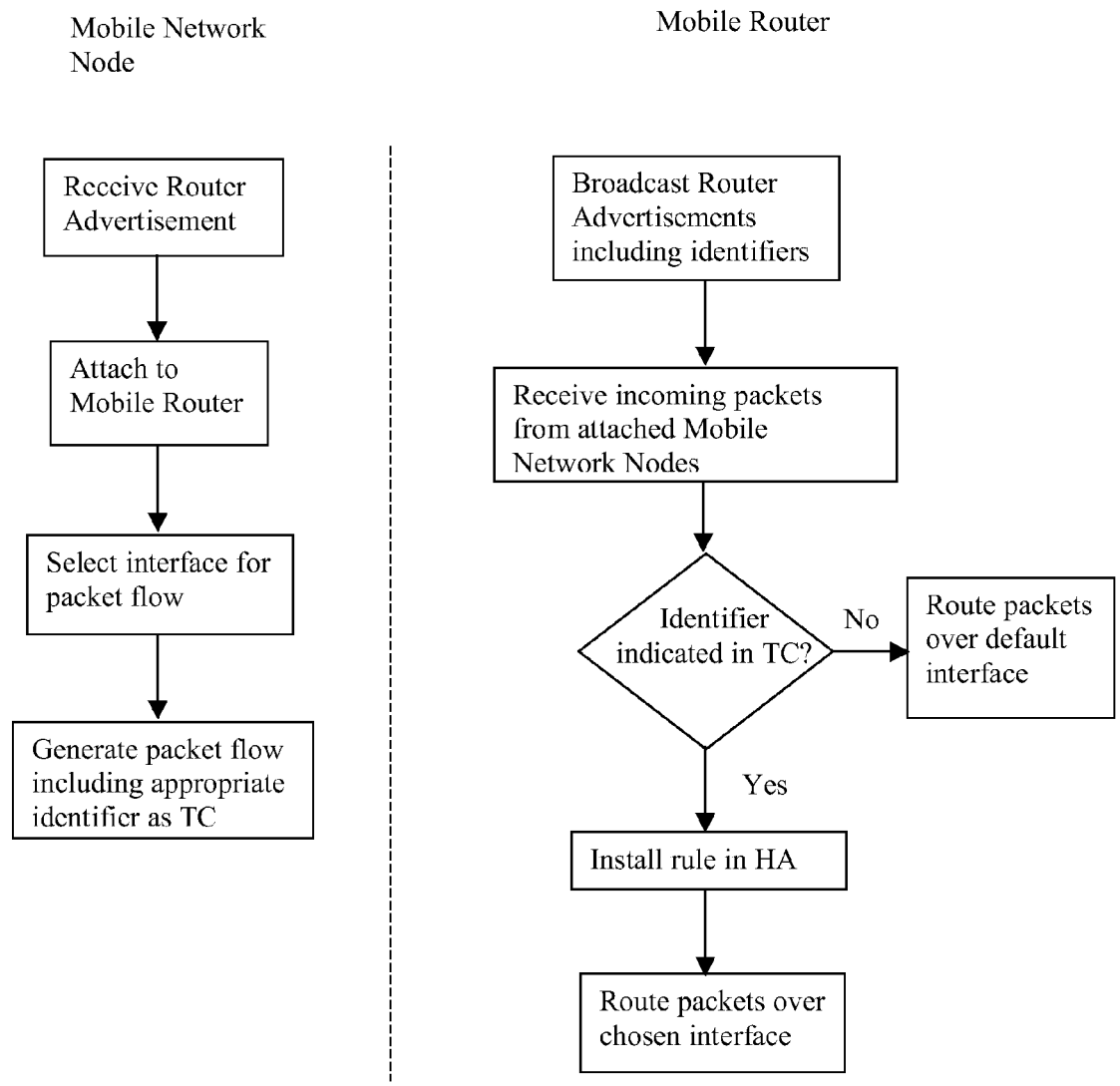
FIG. 3 is a flow diagram illustrating the overall operation of a route selection mechanism.

FIG. 3 is a flow diagram outlining the processes employed at the MR and the MNN in order to implement the embodiment described.

Despite determining from the Traffic Class field that the MNN is requesting that a non-default route be used, the MR can of course choose not to set the new rule for the MNN, in which case the incoming and outgoing traffic for the MNN will be routed via different paths. Furthermore, if no mechanism exists for setting rules between the MR and the HA, this again will result in incoming traffic always being routed via the default path.

It will be appreciated by the person of skill in the art that various modifications may be made to the above described embodiments without departing from the scope of the present invention. In particular, the invention may be applied to IPv4, with the interface identifiers being mapped to ToS values, and the chosen identifier being included in the ToS field of outgoing packets. The detailed embodiment described above may be modified as appropriate for use with mobility protocols such as HIP, MIPv6, MIPv4, DSMIPv6, DSMIPv4.

The invention claimed is:

1. A method of establishing a traffic route for a mobile network node attached to a mobile router, wherein the mobile router has a plurality of upstream interfaces available to it, the method comprising the steps of:
   sending from the mobile router to the mobile network node, identifiers of the interfaces and of their properties, the identifiers mapping to IPv6 traffic classes or IPv4 type of service;
   at the mobile network node, choosing an interface based upon the identified interface properties;
   including in the traffic class or type of service field of at least certain outgoing packets the identifier of the chosen interface; and,
   at the mobile router, causing packets to be routed across the interface corresponding to the identifier contained in the traffic class or type of service fields.

2. The method according to claim 1, wherein the mobile router sends said identifiers within beacons broadcast by the mobile router to advertise its presence.

3. The method according to claim 2, wherein said beacons are IPv6 router advertisement messages.

4. The method according to claim 3, wherein each identifier and associated properties are contained within an options field of the router advertisement messages.

5. The method according to claim 4, wherein each router advertisement message contains an options field for each interface.

6. The method according to claim 1, wherein said step of causing packets to be routed across the interface corresponding to the identifier contained in the packet headers comprises the steps of:
   receiving a packet at the mobile router from a downstream mobile network node;
   identifying the traffic class or type of service field of the packet header;
   establishing a rule at the mobile router for routing outgoing packets across an interface corresponding to the traffic class or type of service; and,
   routing packets received from the mobile network node according to said rule.

7. The method according to claim 6, wherein said rule maps packet source and destination addresses to the chosen interface.

8. The method according to claim 1, further comprising the steps of sending a rule for routing incoming packets from the mobile router to a home agent of the mobile router and applying said rule at the home agent.

9. The method according to claim 8, wherein said rule maps packet source and destination addresses to the chosen interface.

10. The method according to claim 1, wherein the mobile network node includes the identifier of the chosen interface in the traffic class or type of service field of all packets belonging to a given session.

11. The mobile router according to claim 10, further comprising means to establish a routing rule for a packet session, said rule mapping IP source and destination addresses to a chosen interface, and to route outgoing packets according to this rule.

12. The mobile router according to claim 11, further comprising means to establish said rule when a first packet of the session is received by the mobile router and to apply this rule to subsequent packets of the session.

13. The mobile router according to claim 10, further comprising means for notifying a home agent of a rule for causing an incoming packet session to be routed to the mobile router over the same interface as used for the corresponding outgoing packet session.

14. A mobile router, comprising:
   means for providing a plurality of upstream interfaces;
   a first transmitter for sending to a mobile network node identifiers of the interfaces and of their properties, the identifiers mapping to IPv6 traffic classes or IPv4 type of service;
   a receiver for receiving packets from downstream mobile network nodes;
   means for mapping traffic class or type of service fields within at least certain received packets to upstream interfaces; and,
   a second transmitter for causing packets to be routed across the interfaces corresponding to the identifiers contained in traffic class or type of service fields.

15. The mobile router according to claim 14, wherein said first transmitter sends said identifiers within IPv6 router advertisement messages.

16. The mobile router according to claim 15, wherein said first transmitter includes said identifiers in respective options fields of a router advertisement message.

17. A mobile network node, comprising:
- a receiver for receiving from a mobile router identifiers of the upstream interfaces available to the mobile router and of their properties, the identifiers mapping to IPv6 traffic classes or IPv4 type of service;
- means for choosing an interface based upon the identified interface properties; and,
- means for including the identifier of the chosen interface in the traffic class or type of service field of at least certain outgoing packets.

18. The mobile network node according to claim 17, said means for including operative to include the identifier of the chosen interface in the traffic class or type of service field of all packets belonging to a given session.

* * * * *